United States Patent
Albers

(10) Patent No.: US 11,072,924 B2
(45) Date of Patent: Jul. 27, 2021

(54) SYSTEM FOR PROVIDING A FIRE SAFE SEALING IN AN APERTURE IN A WALL, A CEILING OR A FLOOR OF A BUILDING, AN ELEMENT FOR A FIRE SAFE SEALING SYSTEM AND A BULKHEAD FOR A FIRE SAFE SEALING IN THE APERTURE

(71) Applicant: ROCKWOOL INTERNATIONAL A/S, Hedehusene (DK)

(72) Inventor: Rainer Albers, Horstmar (DE)

(73) Assignee: Rockwool International A/S, Hedehusene (DK)

( * ) Notice: Subject to any disclaimer, the term of this patent is extended or adjusted under 35 U.S.C. 154(b) by 126 days.

(21) Appl. No.: 16/471,467

(22) PCT Filed: Nov. 17, 2017

(86) PCT No.: PCT/EP2017/079602
§ 371 (c)(1),
(2) Date: Jun. 19, 2019

(87) PCT Pub. No.: WO2018/114162
PCT Pub. Date: Jun. 28, 2018

(65) Prior Publication Data
US 2020/0115896 A1    Apr. 16, 2020

(30) Foreign Application Priority Data
Dec. 20, 2016 (EP) .................... 16205492

(51) Int. Cl.
*E04D 13/064* (2006.01)
*E04B 1/94* (2006.01)
(Continued)

(52) U.S. Cl.
CPC .............. *E04B 1/948* (2013.01); *A62C 2/065* (2013.01); *E04B 1/947* (2013.01); *F16L 5/04* (2013.01); *F16L 57/04* (2013.01); *H02G 3/22* (2013.01)

(58) Field of Classification Search
CPC . E04B 1/94; E04B 1/947; E04B 1/948; E04B 9/08; E04D 19/06; E06B 5/164;
(Continued)

(56) References Cited

U.S. PATENT DOCUMENTS 3,864,883 A * 2/1975 McMarlin .............. A62C 2/065
                                                52/220.8
4,136,707 A * 1/1979 Gaillot ................... A62C 2/065
                                                137/360
(Continued)

FOREIGN PATENT DOCUMENTS

DE     3504742 A1    8/1986
EP     1051456 B1    12/2002
(Continued)

OTHER PUBLICATIONS

International Search Report and Written Opinion, ISA/European Patent Office, corresponding to PCT/EP2017/079602, dated Sep. 2, 2018.

*Primary Examiner* — Brian E Glessner
*Assistant Examiner* — James J Buckle, Jr.
(74) *Attorney, Agent, or Firm* — Harness, Dickey & Pierce, P.L.C.

(57) ABSTRACT

The disclosure relates to a system for providing a fire safe sealing in an aperture in a wall, a ceiling or a floor of a building, consisting of at least two block shaped sealing elements with two main surfaces being oriented parallel to each other and at least three lateral faces connecting the main surfaces to each other, of which at least one element is made from mineral fibres and a binding agent, whereby (Continued)

lateral faces being arranged adjacent to each other, or lateral faces and main surfaces being arranged adjacent to each other, incorporate an angle being unequal to 90° and whereby each element is shorter than the length of the aperture and smaller than the height of the aperture.

14 Claims, 5 Drawing Sheets

(51) Int. Cl.
  *A62C 2/06* (2006.01)
  *F16L 5/04* (2006.01)
  *F16L 57/04* (2006.01)
  *H02G 3/22* (2006.01)

(58) Field of Classification Search
  CPC ... F16L 5/04; F16L 57/04; H02G 3/22; A62C 2/065
  USPC ............................. 52/232; 169/48, 49
  See application file for complete search history.

(56) References Cited

U.S. PATENT DOCUMENTS

| | | | | |
|---|---|---|---|---|
| 4,189,619 A * | 2/1980 | Pedlow | ................ | C09D 5/185 106/18.11 |
| 4,273,821 A * | 6/1981 | Pedlow | ................ | C09D 5/185 106/18.11 |
| 4,443,019 A * | 4/1984 | Ishido | ................ | C09K 3/10 138/89 |
| 4,558,875 A * | 12/1985 | Yamaji | ................ | C09K 3/10 106/DIG. 4 |
| 5,634,304 A * | 6/1997 | Sakno | ................ | F16L 55/1026 52/232 |
| 8,006,447 B2 * | 8/2011 | Beele | ................ | A62C 2/065 52/232 |
| 9,995,037 B2 * | 6/2018 | Munzenberger | ........ | E04B 1/941 |
| 10,323,407 B1 * | 6/2019 | Robinson | ................ | F16J 15/024 |
| 10,622,795 B2 * | 4/2020 | Karlsson | ................ | A62C 2/065 |
| 2008/0017392 A1 * | 1/2008 | Fallis | ................ | A62C 3/065 169/46 |
| 2011/0088917 A1 * | 4/2011 | Lee | ................ | F16L 5/14 169/45 |
| 2013/0140046 A1 * | 6/2013 | Monk | ................ | F41H 5/0471 169/68 |
| 2013/0255893 A1 * | 10/2013 | Stobich | ................ | E04B 1/948 160/268.1 |
| 2014/0000193 A1 * | 1/2014 | Daniels | ................ | E06B 5/161 52/232 |
| 2019/0271416 A1 * | 9/2019 | Munzenberger | ........ | F16L 5/04 |
| 2019/0366135 A1 * | 12/2019 | Munzenberger | ........ | A62C 2/065 |

FOREIGN PATENT DOCUMENTS

| | | |
|---|---|---|
| EP | 2389985 A1 | 11/2011 |
| GB | 2507016 B | 3/2016 |
| WO | 00/52278 A1 | 9/2000 |

* cited by examiner

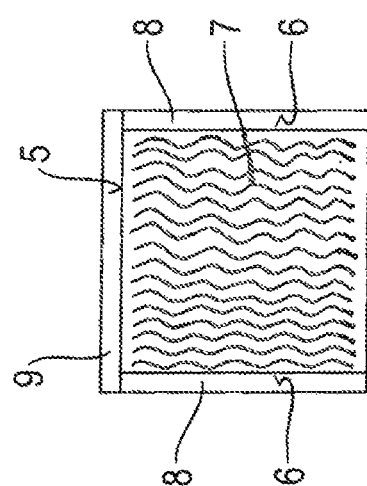
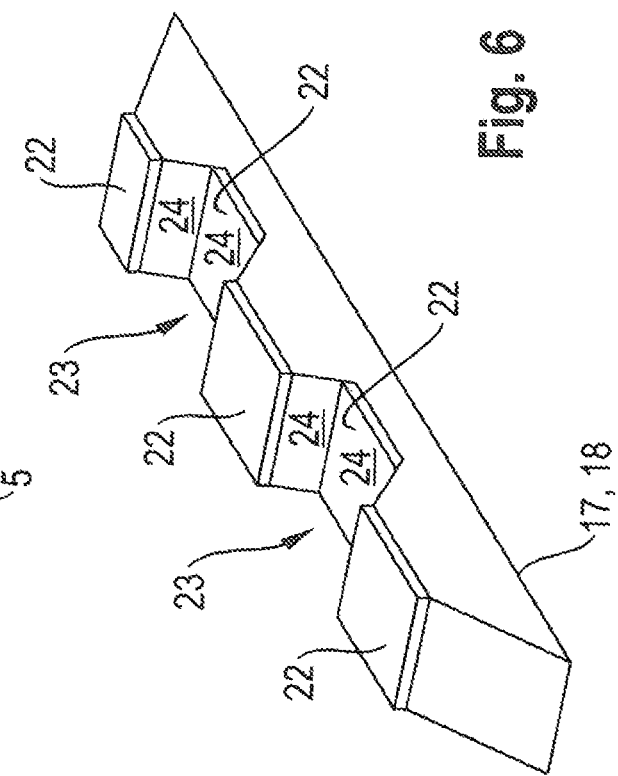
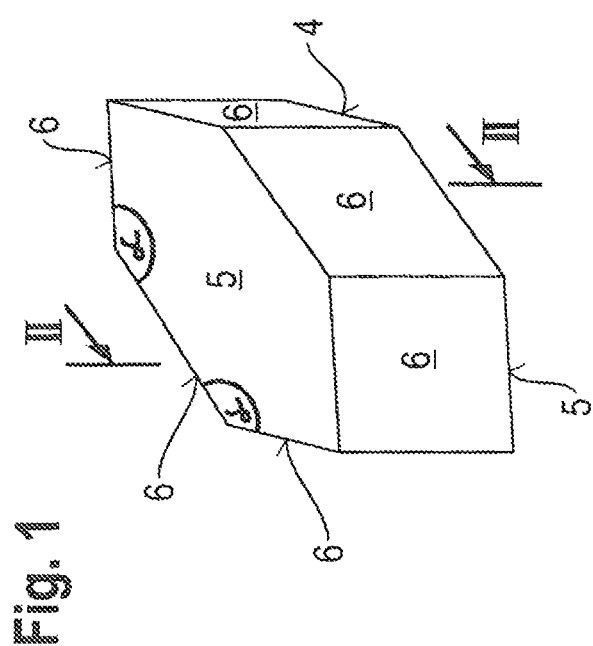
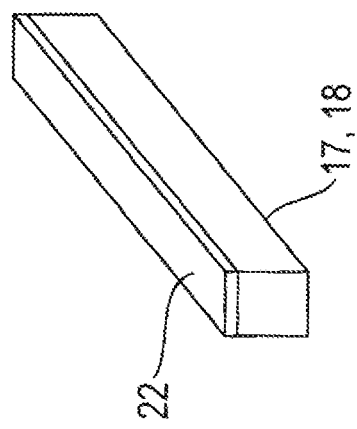

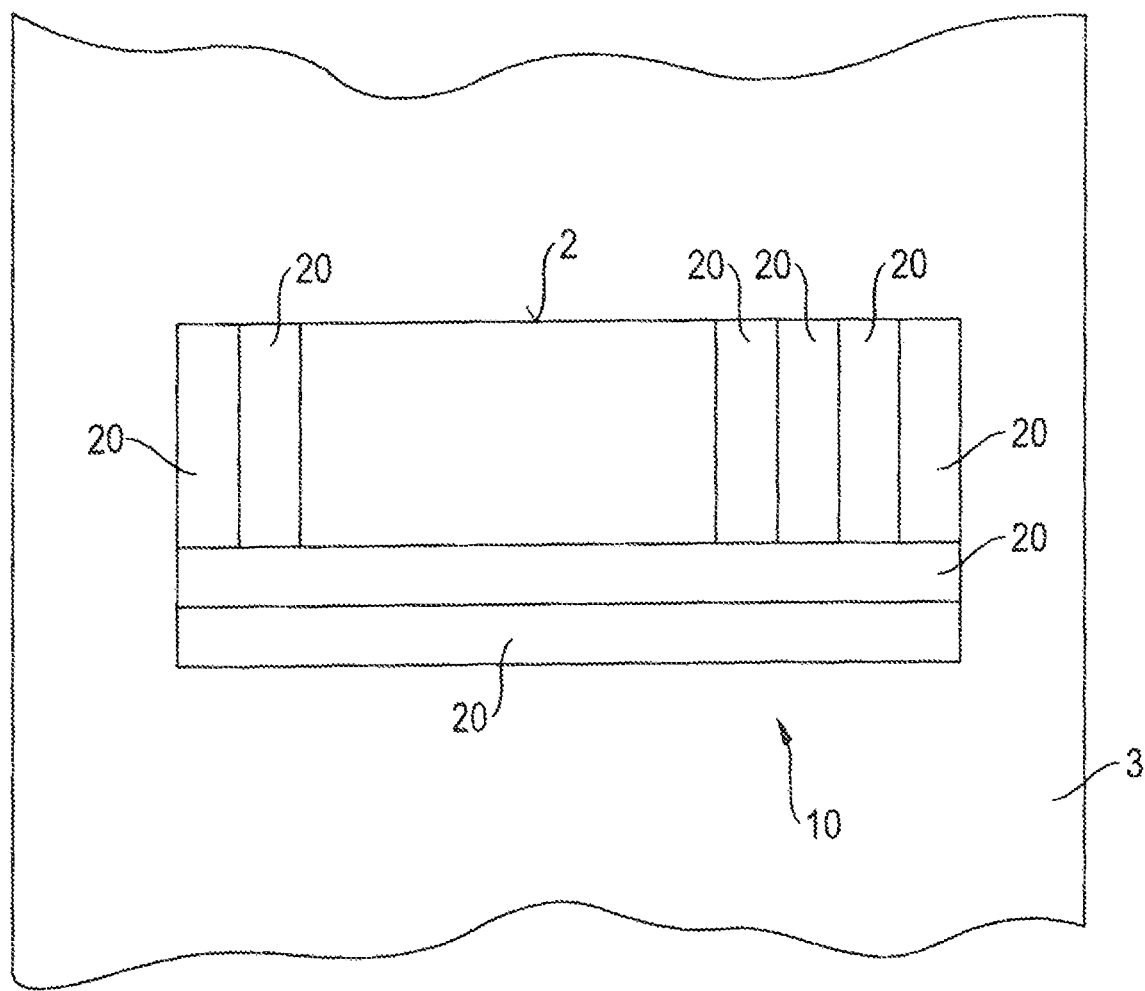

SYSTEM FOR PROVIDING A FIRE SAFE SEALING IN AN APERTURE IN A WALL, A CEILING OR A FLOOR OF A BUILDING, AN ELEMENT FOR A FIRE SAFE SEALING SYSTEM AND A BULKHEAD FOR A FIRE SAFE SEALING IN THE APERTURE

CROSS-REFERENCE TO RELATED APPLICATIONS

This application is a National Stage of International Application No. PCT/EP2017/079602 filed on Nov. 17, 2017. This application claims the priority to European Patent Application No. 16205492.8, filed on Dec. 20, 2016. The entire disclosures of the above applications are incorporated herein by reference.

FIELD

The present disclosure relates to the technical field of fire safe penetration seals for service installations. Main subject of the disclosure is a system for providing a fire safe, i.e. a fire and smoke resistant sealing in an aperture in a wall, a ceiling or a floor of a building, consisting of at least two block shaped sealing elements with two main surfaces being oriented parallel to each other and at least three lateral faces connecting the main surfaces to each other, of which at least one element is made from mineral fibres and a binding agent. Furthermore, main subject of the disclosure is a respective element for said system. Finally, main subject of the disclosure is a bulkhead for a fire safe sealing in an aperture of a wall, a ceiling or a floor of a building, comprising at least two block shaped elements, each having two main surfaces being oriented parallel to each other and at least three lateral faces connecting the main surfaces to each other, of which at least one element is made from mineral fibres and a binding agent.

BACKGROUND

This section provides background information related to the present disclosure which is not necessarily prior art.

Systems for providing a fire safe sealing in an aperture of a building element, especially in a wall, a ceiling or in a floor are well known from the prior art. For example GB 2507016 A1 discloses an insulation for sealing passages through walls comprising a sealing plug for sealing a space between an internal edge of a wall and a through-part, and on at least one lateral of the wall a thermal insulation sleeve surrounding the through-part over a portion of a length thereof starting from the sealing plug. In this prior art the through-part is a pipe. The pipe passes through the wall and is disposed inlateral an orifice defined in the wall so as to pass through a shell being made of mineral fibres. The shell has a certain length and a certain thickness and is cut and installed around the pipe passing through the wall in the passage through the wall. The shell is clamped with stainless iron (steel) wire. A pre-cut polystyrene panel is fitted as close as possible to the pipework to serve as the back of shuttering on one of the two faces. Shuttering will be installed on the other face as a silicone foam is deposited.

A further embodiment of a fire protected penetration is disclosed in WO 00/52278. This fire-protected penetration is used for a conduit passing through a hole in a wall. The conduit has a through-going insulation, preferably of pipe insulation section type, made of mineral wool, which may be glass wool. The space between the hole in the wall and the conduit insulation is filled with packed, radially compressed fire-retardant mineral wool, preferably stone wool. The system of this fire-protected penetration consists of two plaster boards, being inserted into an aperture in a wall. The plaster boards are placed on wall studs which keep the two inner plaster boards at a fixed stud distance from each other. The through-hole has a quadrangular cross-section and is made in the wall. A metallic pipe is passed axially and centrally through the aperture in the wall. On the pipe, a pipe insulation extending through the aperture is arranged in the form of a conventional pipe insulation section made of glass wool. The space between abutments and the corresponding part of the pipe insulation section is filled with packed stone wool. The stone wool is packed around the pipe insulation section such that it is radially very much compressed, so as to be able to expand. If needed, radially inwards towards the pipe insulation section and the pipe to compensate, for instance, for a collapse of the pipe insulation section, if the later is exposed to such a high temperature that the glass wool softens and "settles". The two lateral openings of the aperture in the wall are filled with after-filling or after-reparing material, which suitably contributes to the fire protection. The material is advantageously mortar or plaster or the like. Therefore, such a system consists of an insulation element which is clamped between abutments, for example parts of the wall and the outer surface of a pipe being insulated with a conventional pipe insulation section. Furthermore, at both laterals of the insulation element the aperture is closed by a material like mortar or plaster or the like.

A further system for providing a sealing in an aperture in a wall, a ceiling or a floor of a building is well known from DE 3504742 A1. This system consists of several insulation boards being stacked in an aperture together with a layer of loose mineral fibres being arranged between two insulation boards and surrounding a set of cables in a supporting channel. These parts forming an insert into the aperture in the wall. On both laterals of the wall the insert is covered by a sealing board consisting of two layers of which one layer is a ceramic laminate and the second layer is made of a material building up an insulation layer.

Each of the before described systems have the disadvantage that it is very difficult to install the elements of the system into the aperture of the building as it is necessary to cut holes into a board or to handle different materials made of small parts like loose mineral fibres and/or mortar to build up a sealing plug.

SUMMARY

This section provides a general summary of the disclosure, and is not a comprehensive disclosure of its full scope or all of its features.

Therefore, it is an object of the disclosure to provide a system for a fire safe sealing in an aperture in a wall, a ceiling or a floor of a building, to provide a fire safe sealing element for such a system and to provide a bulkhead for a fire safe sealing in an aperture of a wall, a ceiling or a floor of a building, which is easy to handle, easy to install and which makes it possible to reinstall pipes or to install further pipes or other lines, like conduits, cable, wires or the like without removing the whole sealing plug.

Furthermore, it is an object of the disclosure to provide a sealing element which can be used in a system and/or a bulkhead according to the disclosure and in apertures of different sizes and which makes it easy to build up a sealing plug independently of the size of the aperture in short time even by unskilled persons.

According to a first solution a system according to the disclosure is characterized in that it consists of a certain number of sealing elements with lateral faces of the elements being arranged adjacent to each other and incorporating an angle being unequal to 90°. According to an embodiment lateral faces and main surfaces being arranged adjacent to each other incorporate an angle being unequal to 90°, and whereby in both embodiments each element is shorter than the length of the aperture and smaller than the height of the aperture.

With respect to a sealing element the before mentioned objects are achieved by a block with two main surfaces being oriented parallel to each other and at least three lateral faces connecting the main surfaces to each other, whereby the block is made from mineral fibres and a binding agent, and whereby the lateral faces being arranged adjacent to each other, or the lateral faces and main surfaces being arranged adjacent to each other, incorporate an angle being unequal to 90°.

Finally, the before mentioned objects are solved with respect to a bulkhead according to the disclosure in that lateral faces of respective sealing elements being arranged adjacent to each other, or lateral faces and main surfaces of said elements being arranged adjacent to each other, incorporate an angle being unequal to 90° and whereby each element is shorter than the length of the aperture and smaller than the height of the aperture.

Main aspect of the disclosure is the use of a sealing element which cross-section is not rectangular. Preferably, the element has a hexagonal cross-section and therefore six lateral faces being equal in size and shape. The two main surfaces of such element being oriented parallel to each other and main surfaces and lateral faces including a right angle, thus forming a right hexagonal prism. However, in a further embodiment of the disclosure the element is defined by a triangular cross-section having therefore three lateral faces, whereby preferably two of them are equal in size and shape. The big advantage of these sealing elements is that they can easily be inserted and arranged into an aperture whereby several of said elements are needed. Therefore, a sealing plug can be built up by the elements leaving a space for the pipe or the like. To close the remaining area in which the pipe or the like is installed a smaller sealing element, for example an element equal to the sealing elements according to the disclosure can be used which has to be manipulated in that an opening for the pipe or the like is cut into this element. Because of the shape of the element it is easy to adapt these elements to apertures of different sizes and shapes. The elements can be inserted into the aperture leaving a hole through which the pipe or the like is guided. In cases where this aperture is relatively small with respect to the elements being installed mortar or the like can be used to close remaining gaps.

In general a fire safe sealing system according to the disclosure can be offered with a certain number of sealing elements for a certain size of the aperture so that the producer of the system or the elements can offer different sizes of sealing systems containing for example 6, 12 or 24 elements. The customer can use the system with the needed size to close a certain aperture. Systems with different amounts of elements can be combined.

Because at least one sealing element is made from mineral fibres and a binding agent it is very easy to cut this element into a shape and a size to close parts of the aperture after full-size elements are inserted into the aperture. Of course, it is of advantage to build up every element of the system of mineral fibres and a binding agent, i.e. mineral wool according to European Standard EN 13162. This material has the big advantage that it is fire resistant, respectively non-combustible according to EN 13501-1 and moreover has very good thermal and noise insulation characteristics.

As already pointed out it is of advantage to use sealing elements having a hexagonal cross-section and therefore six lateral faces being equal in size and shape. These elements can be put together in a way that they clamp each other within the aperture. This characteristic is increased by using elements made of mineral fibres which have flexible and compressible properties. Due to the roughness of the surfaces these elements provide high frictional resistance which makes it easier to install the elements in the aperture so they are clamp or friction fitted.

According to a further embodiment of the system at least one lateral face of the element comprises a layer of a preferably intumescent material and/or at least one main surface is provided with a cover adhered to the main surface. The cover can be an intumescent material, too. Such material has the advantage that it swells as a result of heat exposure, e.g. in case of a fire, thus gaps between elements will be closed. Alternatively, at least one main surface of the element can be provided with a metal foil or other materials increasing the insulation characteristics of elements made of mineral fibres and a binding agent. Normally the elements are arranged in the aperture so that the main surfaces of the elements are flush with the outer faces of the wall, ceiling or floor.

According to a further embodiment of the system the mineral fibres of the element are mostly oriented parallel to the lateral faces and therefore mostly in a rectangular direction to the main surface of the element. This fibre orientation makes it possible to increase the compressibility of the elements in a direction rectangular to the lateral faces even in case of higher bulk densities so that it is easier to insert an element into smaller spaces by compressing the element before inserting the element into the space and afterwards removing the compression so that the element expands and closes a gap for example between the wall and the sealing plug made by the elements.

The system according to the disclosure can additionally contain filler elements being sections of the full-size sealing elements and thus of the same material. Alternatively they can be made of gypsum, mortar, concrete, inorganic sealants and/or combinations of these materials. Especially in case of rectangular apertures and sealing elements having a hexagonal cross-section there is a need for elements being able to close the spaces into which a full element cannot be inserted. This can be done by the before mentioned filler elements being a section of the elements and/or by filler elements being made of gypsum, mortar, concrete, inorganic sealants and/or combinations of these materials whereby it is of advantage if these filler elements can be formed in situ which means during the installation of the bulkhead into the aperture. Filler elements of mineral wool can easily be obtained by cutting an element lengthwise or crosswise.

Furthermore, the system according to the disclosure may additionally comprise a framework consisting of two pairs of beams, of which beams of one pair are oriented parallel to each other, and being connected to each other. A single beam may at first hand constitute an opening for inserting the elements. Such a framework can easily be inserted into an aperture before the sealing elements are installed within the framework. The framework can be adjusted with respect to the aperture before the elements are inserted. This means, that the framework has a particular opening which is prepared to receive the sealing elements of the system and differences between the outer dimension of the framework and the inner surfaces of the aperture can be filled up for example by using gypsum, mortar, concrete or loose fibres which are stuffed between the framework and the building of the wall in the area of the aperture. Using a framework has the advantage that the system can be easily used in apertures even if these apertures have no rectangular transverse section.

An embodiment of the framework is characterized in that the beams of the framework are made of mineral fibres and a binding agent and/or have an inner surface with recesses being formed according to an outer contour of the sealing elements to be partly inserted into the recesses. The advantage of this embodiment is that the use of mineral fibres and a binding agent as material for the framework achieves high insulation characteristics and does not influence the fire resistance of the sealing plug or bulkhead negatively. To use beams having an inner surface with recesses being formed according to an outer contour of the elements to be partly inserted into the recesses has the advantage that it is very easy to install the elements into the framework whereby the elements are fixed in the recesses and a beneficial arrangement is predetermined by the recesses so that someone using the system can be sure to prohibit mistakes in the insulation of the elements. Therefore the system of the disclosure can be easily used by persons having less skill. Furthermore all elements can be prefabricated and arranged in a system or assembly including the framework and the sealing elements to be combined as to provide a prefabricated bulkhead or penetration board for a fire safe sealing in an aperture in a wall, a ceiling or a floor.

Such bulkhead or penetration board secures fire safe penetration of pipes, cable and the like through a wall. The bulkhead or penetration board has a rectangular shape that fits into an opening in a wall. It is made of a fire resistant material, e. g. mineral wool which in a preferred embodiment is stone wool. It may be provided with pre-cut slits that subdivide an inner part of the board into smaller areas or elements. As an example the inner area of a stone wool penetration board can be cut into hexagonal sealing elements as has been described above. The surface of the bulkhead or penetration board may comprise an intumescent coating being pre-applied. In use the pre-cut penetration board can be handled as a single unit, since the individual sealing elements tend to stick together due to friction between them. At the building side the bulkhead or penetration board is arranged in the opening in a wall, a ceiling or a floor and relevant sealing elements where pipes or cables penetrate the wall are removed and prepared to surround the pipes or cables penetrating. Due to the preferred hexagonal shape of the sealing elements any piece or element can be removed without the other ones falling out. The element that has been removed is prepared with a suitable hole for the pipe or cable and then remounted. As already mentioned, the preferred embodiment comprises hexagonally-shaped cut-pieces or elements. In case the framework is very much smaller than the aperture in the building the system can additionally consist of distance elements to be combined with the sealing elements and/or the framework and being made of mineral fibres and a binding agent, whereby the distance elements have a bulk density being lower than the bulk density of the framework and/or the elements, so that the distance elements have a compressibility allowing to equalize uneven areas of parts of the building defining the aperture. Such distance elements may comprise a bulk density between 50 and 100 kg/m$^3$. The distance elements can be installed between the circumferential wall of the building aperture and the framework or the elements. Due to their comparatively low bulk density the distance elements can be adapted to the shape of the circumferential wall in the area of the aperture and/or to the framework and/or the sealing elements to be inserted into the aperture.

For the application of the system in a ceiling or a floor of a building it is of advantage to use elements having triangular, especially isosceles triangular or trapezoidal longitudinal section. These elements can be fitted into an aperture in a ceiling or a floor without the risk of falling through the aperture as it is possible to use these elements to form a bulkhead with oversize compared to the aperture, so that said elements are clamp-fitted in the aperture. Consequently elements are installed alternating.

Finally, with respect to the system it has been found as of advantage that the sealing elements have a thickness between 40 and 80 mm, especially between 50 and 60 mm, and a bulk density between 100 and 200 kg/m3, especially between 150 and 160 kg/m3. The given thickness is useful for a wide range of apertures and with different wall thicknesses. Even in the case of a very thick wall for example of 250 mm it is possible to use for example five bulkheads made of five systems lateral by lateral thereby closing the aperture over the whole thickness of the wall.

With respect to the sealing element and the bulkhead according to the disclosure and the advantages of the embodiments of the subclaims it is referred to the above description of the embodiments of the system.

DRAWINGS

The drawings described herein are for illustrative purposes only of selected embodiments and not all possible implementations, and are not intended to limit the scope of the present disclosure.

The disclosure will now be described in more detail by means of exemplifying embodiments with reference to the accompanying drawings, in which identical or corresponding components have been given the same reference numerals.

FIG. 1 shows a fire safe sealing element of a fire safe sealing system according to the disclosure in a perspective view;

FIG. 2 shows the element according to FIG. 1 in a cross-sectional view along the line II-II in FIG. 1;

FIG. 5 shows a beam of a framework as part of a system according to the disclosure in a perspective view;

FIG. 6 shows a second embodiment of a beam of a framework as part of the system according to the disclosure in a perspective view;

FIG. 9 shows a third embodiment of the bulkhead using the system according to the disclosure in a front view;

Corresponding reference numerals indicate corresponding parts throughout the drawing.

DETAILED DESCRIPTION

Figure 3:
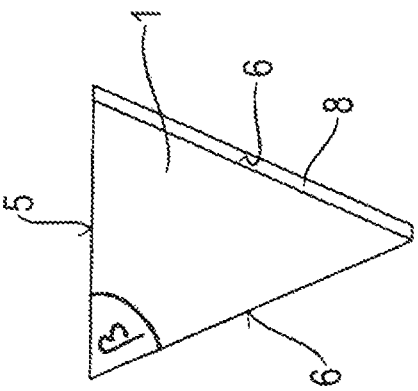
FIG. 3 shows a second embodiment of an element of a system according to the disclosure in a lateral view.

Example embodiments will now be described more fully with reference to the accompanying drawing.

A fire safe sealing element 1 as part of a system for providing a fire safe sealing in an aperture 2 (FIGS. 7 to 9) in a wall 3 (FIGS. 7 to 9) in form of a block 4 has two main surfaces 5 being oriented parallel to each other and six lateral faces 6 connecting the main surfaces 5 to each other, whereby the block 4 is made from mineral fibres and a binding agent. The lateral faces 6 being arranged adjacent to each other incorporate an angle being unequal to 90°. The element 1 has a hexagonal cross-section and the six lateral faces 6 are equal in size and shape. The two main surfaces 5 are oriented parallel to each other and main surfaces 5 and lateral faces 6 include a right angle, thus forming a right hexagonal prism.

According to FIG. 2 showing the sealing element 1 in cross-section along the line II-II in FIG. 1 it can be seen that the element 1 consists of mineral fibres 7 and a binding agent whereby the mineral fibres 7 are mostly oriented parallel to the lateral faces 6 and therefore mostly oriented in a rectangular direction to the main surfaces 5. Furthermore, it can be seen that the lateral faces 6 are covered with a layer 8 of intumescent material. It is possible to cover all lateral faces 6 of the element 1 with intumescent material or only one half of the element 1 which means that three lateral faces 6 being adjacent to each other are provided with intumescent material.

According to FIG. 2 the upper main surface 5 has a cover 9 adhered to the main surface 5 for example by gluing. The cover 9 consists of a metal foil, for example a foil made of alloy.

Figure 4:
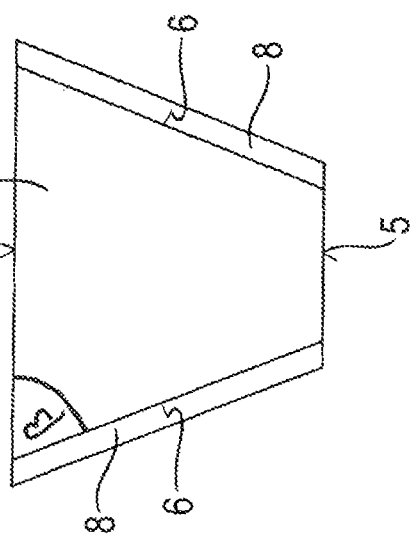
FIG. 4 shows a third embodiment of an element of a system according to the disclosure in a lateral view.

Two further embodiments of the sealing element 1 are shown in FIG. 3 and FIG. 4. These embodiments differ from the embodiments of FIG. 1 and FIG. 2 in that the element 1 according to FIG. 4 has an isosceles triangular longitudinal section. One lateral face 6 is equipped with a layer 8 of intumescent material. The element 1 of this embodiment has a very slender second main surface 5 in the bottom, being an edge formed by two connected lateral faces 6. The element 1 has two lateral faces 6 being triangular and two lateral faces 6 being rectangular.

An embodiment of the sealing element 1 according to FIG. 3 has a trapezoidal longitudinal section and therefore two main surfaces 5 of different size connected via two lateral faces 6 each being covered with a layer 8 of intumescent material and being rectangular whereas two further lateral faces 6 are being of a trapezoidal form. The upper main surface 5 and the lateral faces 6 incorporate an angle β being smaller than 90°.

Figure 11:
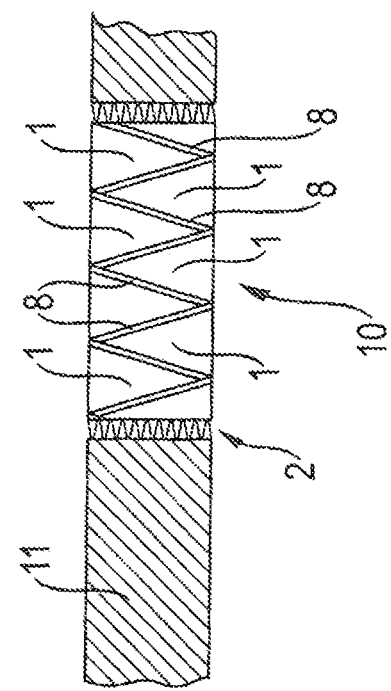
FIG. 10 shows a bulkhead in a ceiling using a system according to the disclosure in a lateral view and FIG. 11 shows a second embodiment of a bulkhead in a ceiling using the system according to the disclosure in a lateral view.
Figure 10:
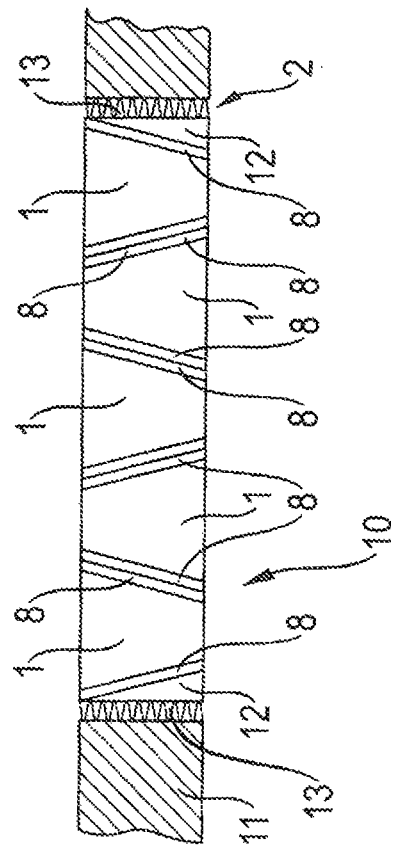

The embodiment according to FIGS. 3 and 4 are preferably used for a bulkhead 10 in a ceiling 11 of a building as shown in FIG. 10 and FIG. 11.

FIG. 10 shows the use of sealing elements 1 according to FIG. 3 which are inserted into an aperture 2 in alternate orientation. At both ends of the bulkhead 10 sealing elements 12 are inserted into the aperture 2 and are connected to the ceiling 11 for example by using an adhesive 13. The elements 12 are a fraction of an element 1 and according to FIG. 10 provided with a triangular longitudinal section whereby the elements 12 are oriented with their hypotenuse to an element 1 being arranged adjacent to the element 12 and being in contact to the element 1 via the hypotenuse whereby the longer cathetus of the element 12 is connected to the ceiling 11. The shorter cathetus of the element 12 is oriented downwards with respect to the ceiling 11 and being flush with an outer surface of the ceiling.

FIG. 11 shows a similar construction by using sealing elements 1 according to FIG. 4.

Figure 7:
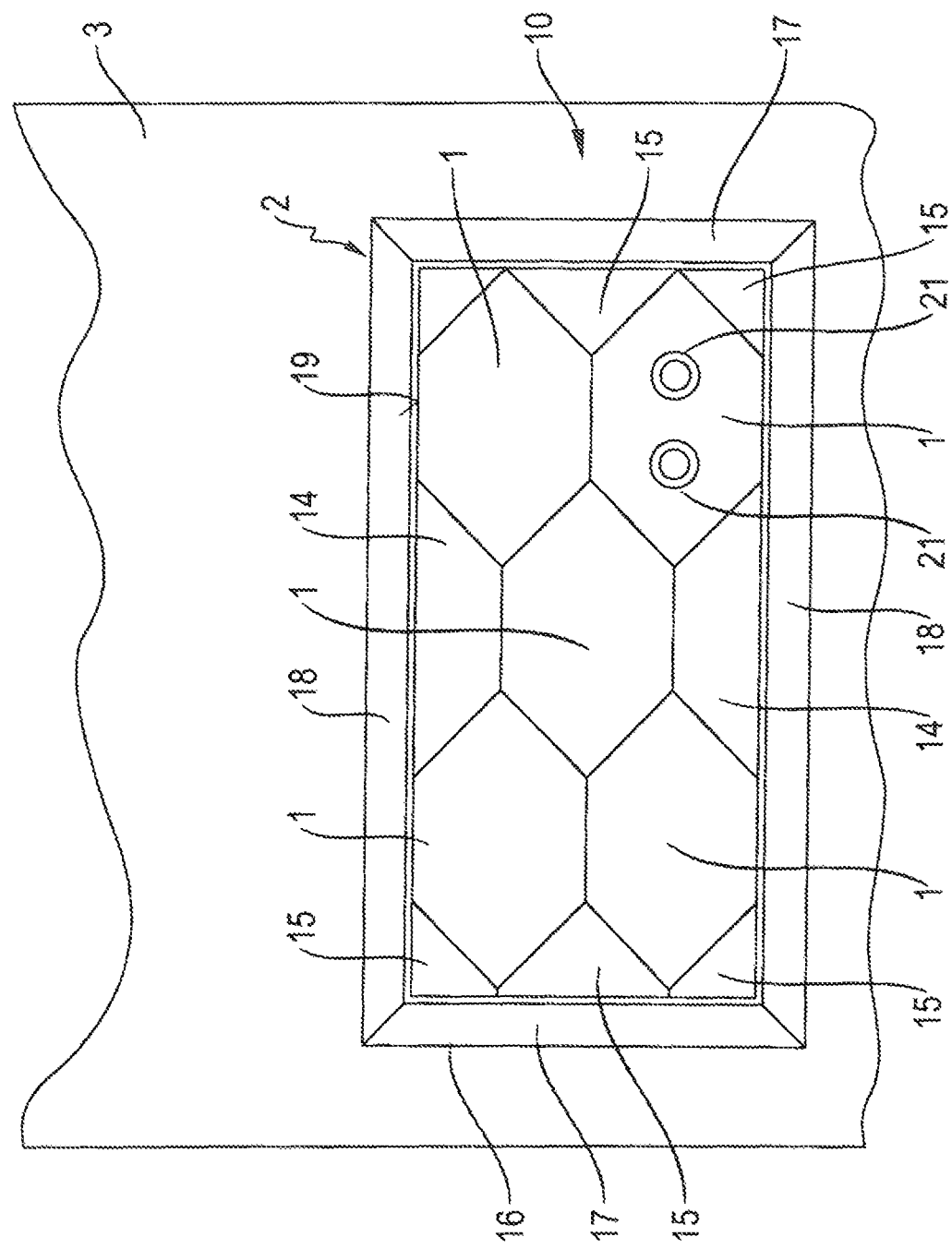
FIG. 7 shows a bulkhead for a fire safe sealing in an aperture of a wall using a system according to the disclosure in a front view.
Figure 8:
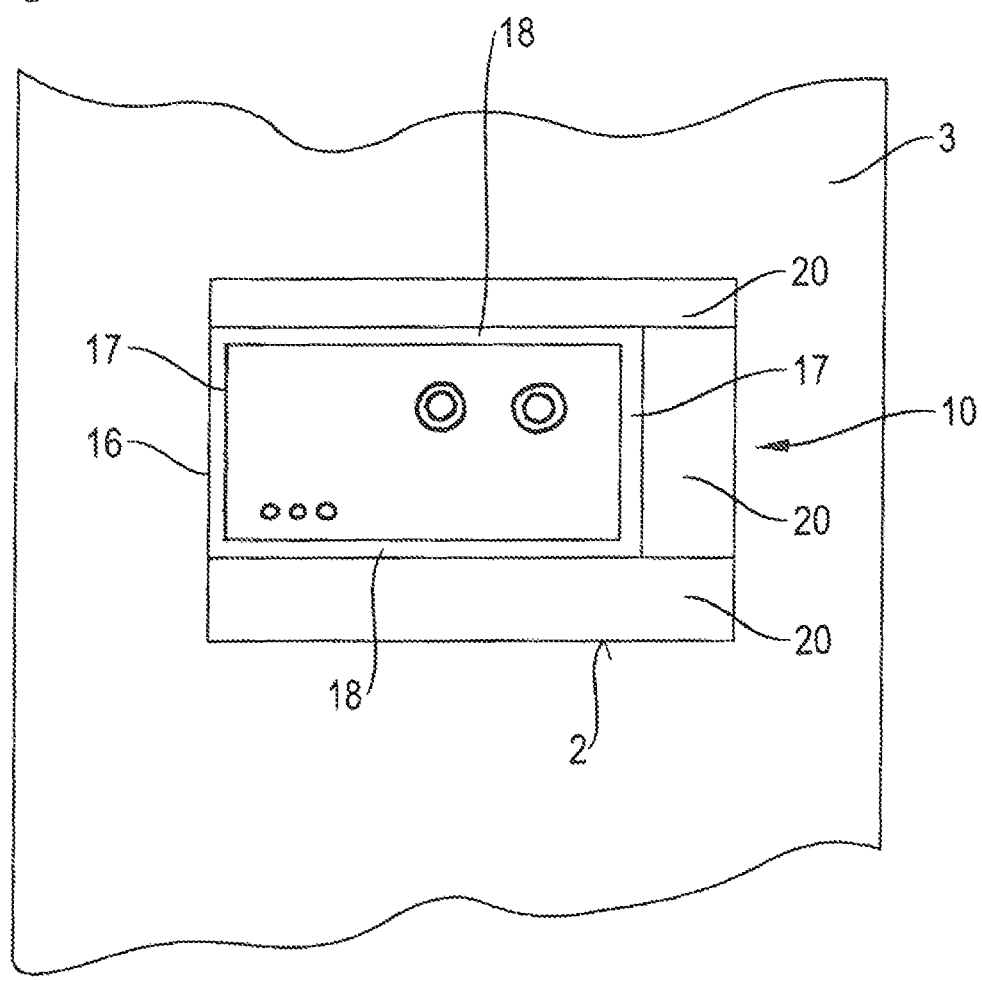
FIG. 8 shows a second embodiment of the bulkhead using a system according to the disclosure in a front view.

FIGS. 7 to 9 illustrate three embodiments of a bulkhead 10 for a fire safe sealing in an aperture 2 of a wall 3. FIG. 7 shows the bulkhead 10 in more detail being described in the following and which details are of course present in the embodiments of FIGS. 8 and 9.

The bulkhead 10 is built up by using five sealing elements 1 of honeycomb-like shape. Furthermore, two halfs 14 of elements 1 are used in the bulkhead 10. Further elements 15 being parts of the elements 1 are used to complete the bulkhead 10 of rectangular shape to be inserted into a framework 16 being inserted into the aperture 2. The framework 16 consists of two beams 17 made of mineral fibres and a binding agent and oriented parallel to each other. The beams 17 are arranged at narrow laterals of the aperture 2 and are connected via beams 18 being arranged at the long laterals of the aperture 2. The beams 17, 18 are connected via mitres and consist of mineral fibres and a binding agent. The beams 17, 18 may be connected to the wall 3 via an adhesive. A gap 19 between the sealing elements 1, 14, 15 and the inner surface of the beams 17, 18 is filled with an intumescent material.

In FIG. 7 it is visible that the beams 17, 18 of the framework 16 surround the sealing elements 1, 14, 15 totally. Nevertheless, it is possible that the beams 17, 18 are arranged at only one, two or three laterals of the elements 1, 14, 15.

FIGS. 8 and 9 show embodiments of the bulkhead 10 in a wall 3 being additionally provided with distance elements 20 made of mineral wool, i.e. mineral fibres and a binding agent whereby the distance elements 20 have a lower bulk density than the beams 17, 18 of the framework 16 and/or of the sealing elements 1, 14, 15. In FIG. 8 it is visible that the distance elements 20 are arranged on both long laterals of the aperture 2 and one narrow lateral of the aperture 2, whereas FIG. 9 shows a bulkhead 10 using several mineral fibre boards as distance elements 20 being arranged at two narrow laterals and one long lateral of the aperture 2. It has to be pointed out that the part of the bulkhead in FIGS. 8 and 9 being arranged within the framework 16 and/or within the distance elements 20 is similar to the construction being shown in more detail in FIG. 7. Therefore, these bulkheads 10 are also used to lead two or more pipes 21 or the like through the aperture 2 and close the aperture 2 in a fire resistant way.

The disclosure has the big advantage that if for example only a few pipes 21 or the like are running through the aperture 2 the rest of the aperture 2 has to be closed in a simple way by using the sealing elements 1. Furthermore, if more pipes 21 have to be installed in a later stage it is possible to remove only one element 1 and to drill holes into this element 1 for further pipes 21 or to replace the element 1 by an element 1 already having holes for leading pipes 21 through the aperture 2.

Because of the shape of the sealing elements 1 it is very easy to build up the bulkhead 10 as each element 1 can be arranged easily on one surface of the framework 16 according to FIG. 7, for example the element 1 with the two pipes 21. One half 14 of an element 1 is arranged bilaterals the first element 1 whereby one lateral face 6 of the half 14 is in contact with one lateral face 6 of the element 1. In the next step a second element 1 is arranged on the surface of the framework 16 bilaterals the half 14 whereby one lateral face 6 of the second element 1 is in contact with the second lateral face 6 of the half 14. In the next step a third sealing element 1 is arranged on top of the half 14 thereby being in contact via one lateral face 6 with one lateral face 6 of the second element 1 and the first element 1 as well as with one lateral face 6 of the half 14. In a next step two further elements 1 are arranged on top of the elements 1 being arranged on a surface of the framework 16 thereby being in contact with lateral faces 6 of the elements 1 arranged on one surface of the framework 16 and of the element 1 being arranged in the centre of the aperture 2. Finally, all further gaps in the aperture 2 within the framework 16 are filled with a second half 14 and further elements 15 which may consist of mineral fibre elements or for example of cement, mortar or the like. Due to the shape of the sealing elements 1 it is very easy to exchange every element 1 at a later stage without destroying the whole bulkhead 10.

FIGS. 5 and 6 show two embodiments of a part of the framework 16, namely the beam 17 or 18. The beam 17, 18 has a rectangular cross-section and is bar-shaped. Although FIGS. 5 and 6 only show one beam 17, 18 it has to be highlighted that the framework 16 can consist of four beams 17, 18 being one single piece, for example made of a mineral fibre board into which an opening of rectangular shape is cut and the inner part is removed.

Coming back to the FIGS. 5 and 6 it can be seen that in both figures the beam 17, 18 has a layer 22 of intumescent material. Furthermore, the layer 22 can be an adhesive to connect elements 1 to the beam 17, 18.

The embodiment of FIG. 6 is additionally provided with recesses 23 being formed according to an outer contour of the sealing elements 1 to be partly inserted into these recesses 23. The layer 22 is provided in the recesses 23, too. In cross-section the recesses are trapezoidal. Furthermore, the surfaces 24 of the recess 23 are equal in size to the lateral faces 6 of the element 1.

The invention claimed is:

1. A system for providing a fire safe sealing in an aperture in a wall, a ceiling or a floor of a building, comprising of at least two block shaped sealing elements with two main surfaces being oriented parallel to each other and at least three lateral faces connecting the main surfaces to each other, of which at least one element is made from mineral fibers and a binding agent, whereby lateral faces being arranged adjacent to each other, or lateral faces and main surfaces being arranged adjacent to each other, incorporate an angle being unequal to 90° and whereby each element is shorter than the length of the aperture and smaller than the height of the aperture.

2. The system according to claim 1, wherein the sealing elements have a hexagonal cross-section and therefore six lateral faces being equal in size and shape.

3. The system according to claim 1, wherein at least one lateral face of the elements has a layer of an intumescent material and/or at least one main surface has a cover adhered to the main surface.

4. The system according to claim 1, further comprising filler elements being a section of the elements and/or being made of gypsum, mortar, concrete, inorganic sealants and/or combinations of these materials.

5. The system according to claim 1, further comprising a framework consisting of two pairs of beams being oriented parallel to each other and being connected to each other, or being a single piece to constitute an opening for inserting the sealing elements.

6. The system according to claim 5, wherein the beams of the framework are made of mineral fibers and a binding agent and/or have an inner surface with recesses being formed according to an outer contour of the sealing elements to be partly inserted into the recesses.

7. The system according to claim 1, further comprising distance elements to be combined with the sealing elements and/or the framework and being made of mineral fibers and a binding agent, whereby the distance elements have a bulk density being lower than the bulk density of the framework and/or the elements, so that the distance elements have a compressibility allowing to equalize uneven areas of parts of the building defining the aperture.

8. The system according to claim 1, the elements have a triangular section or a trapezoidal longitudinal section.

9. The system according to claim 1, wherein the elements have a thickness between 40 and 80 mm, and a bulk density between 100 and 200 kg/m$^2$.

10. A bulkhead for a fire safe sealing in an aperture of a wall, a ceiling or a floor of a building, comprising at least two block shaped sealing elements, each having two main surfaces being oriented parallel to each other and at least three lateral faces connecting the main surfaces to each other, of which at least one element is made from mineral fibres and a binding agent, whereby lateral faces being arranged adjacent to each other, or lateral faces and main surfaces being arranged adjacent to each other, incorporate an angle being unequal to 90° and whereby each element is shorter than the length of the aperture and smaller than the height of the aperture.

11. The bulkhead according to claim 10, further comprising a framework consisting of two pairs of beams being oriented parallel to each other and being connected to each other or being a single piece to constitute an opening for inserting the elements.

12. The bulkhead according to claim 10, being designed as a prefabricated bulkhead or penetration board for a fire safe sealing in an aperture of a wall, a ceiling or a floor of a building comprising pre-cut slits that subdivide an inner part of the board into smaller areas and/or sealing elements.

13. The bulkhead according to claim 10, wherein it is made of mineral fibers and a binding agent and in that it provides a thickness between 40 and 80 mm, and a bulk density between 100 and 200 kg/m$^2$.

14. The bulkhead according to claim 10, further comprising distance elements to be combined with the elements and/or the framework and being made of mineral fibers and a binding agent, whereby the distance elements have a bulk density being lower than the bulk density of the framework and/or the elements, so that the distance elements have a compressibility allowing to equalize uneven areas of parts of the building defining the aperture.

* * * * *